US008639598B2

(12) United States Patent
Compton et al.

(10) Patent No.: US 8,639,598 B2
(45) Date of Patent: Jan. 28, 2014

(54) ERROR REPORTING AND TECHNICAL SUPPORT CUSTOMIZATION FOR COMPUTING DEVICES

(75) Inventors: Matthew Charles Compton, Avon, IN (US); Nikhil Khandelwal, Tucson, AZ (US); Michael R. Maletich, Chicago, IL (US); Richard Albert Welp, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 161 days.

(21) Appl. No.: 12/905,137

(22) Filed: Oct. 15, 2010

(65) Prior Publication Data
US 2012/0095888 A1  Apr. 19, 2012

(51) Int. Cl.
*G07F 19/00* (2006.01)
*G06Q 30/00* (2012.01)

(52) U.S. Cl.
USPC .............................................. 705/34; 705/26

(58) Field of Classification Search
USPC .......................................................... 705/34
See application file for complete search history.

(56) References Cited

U.S. PATENT DOCUMENTS

| 6,782,377 | B2 | 8/2004 | Agarwal et al. | |
| 7,403,901 | B1 | 7/2008 | Carley et al. | |
| 7,500,143 | B2 * | 3/2009 | Buia et al. | 714/26 |
| 8,332,807 | B2 | 12/2012 | Finlayson et al. | |
| 2006/0112106 | A1 * | 5/2006 | Wolf et al. | 707/10 |
| 2009/0043669 | A1 * | 2/2009 | Hibbets et al. | 705/26 |
| 2009/0134853 | A1 * | 5/2009 | Suzuki et al. | 323/234 |
| 2009/0164853 | A1 * | 6/2009 | Gokhale et al. | 714/57 |

* cited by examiner

*Primary Examiner* — Garcia Ade
(74) *Attorney, Agent, or Firm* — Nelson and Nelson; Daniel P. Nelson; Alexis V. Nelson

(57) ABSTRACT

A method for providing technical support for a computing device is disclosed herein. In one embodiment, such a method includes detecting a problem associated with a computing device. The method then determines a support level assigned to the computing device. A set of problems is associated with the support level. If the problem belongs to the set of problems associated with the support level, the method automatically sends a message to a support provider so that the support provider can address the problem. A corresponding system and computer program product are also described herein.

10 Claims, 7 Drawing Sheets

ERROR REPORTING AND TECHNICAL SUPPORT CUSTOMIZATION FOR COMPUTING DEVICES

BACKGROUND

Field of the Invention

This invention relates to systems and methods for customizing error reporting and technical support for computing products such as hardware and software products.

BACKGROUND OF THE INVENTION

In today's world of technology solutions, the need to assemble systems quickly and produce cohesive products within a short time frame is ever increasing. Such products often need to be designed to satisfy a wide variety of different customers at varying price points and with different technical requirements. For example, some customers may require a comprehensive version of a product with an extensive set of features while other customers may require a simpler version of the same product with a less extensive set of features. A more comprehensive version of the product will generally be priced higher than the simpler version.

Customers may also vary greatly in their need for technical assistance to support the operation of such computing products. Some customers, for example, may not employ technical support personnel and thus may require significant technical assistance from the vendor or a third party. Other customers may maintain a technical support staff to handle problems internally. Because of the diverse needs of different customers, providing the right mix of service and support can be a significant challenge.

In today's marketplace, the competitive pricing of warranty and service contracts is a major focus for computing products. Such warranty and service contracts can have a significant impact on sales and the ability to effectively market a product. Nevertheless, current warranty and service contracts are frequently designed in an inflexible manner. Many offer an "all-or-nothing" or limited set of options that are insufficient for a diverse set of customers with different needs.

In view of the foregoing, what are needed are systems and method to more effectively tailor warranties and service contracts for different types of customers. For example, it would be an advance in the art to more effectively customize technical support to meet the needs of different customers. It would be a further advance to more effectively customize the error reporting capabilities of a computing device to correspond to different levels of technical support.

SUMMARY

The invention has been developed in response to the present state of the art and, in particular, in response to the problems and needs in the art that have not yet been fully solved by currently available systems and methods. Accordingly, the invention has been developed to provide systems and methods for providing technical support for a computing device. The features and advantages of the invention will become more fully apparent from the following description and appended claims, or may be learned by practice of the invention as set forth hereinafter.

Consistent with the foregoing, a method for providing technical support for a computing device is disclosed herein. In one embodiment, such a method includes detecting a problem associated with a computing device. The method then determines a support level assigned to the computing device. A set of problems is associated with the support level. If the problem belongs to the set of problems associated with the support level, the method automatically sends a message to a support provider so that the support provider can address the problem. A corresponding system and computer program product are also described herein.

In another embodiment of the invention, a method for providing technical support for a computing device includes determining the different types of problems that can occur on the computing device. The method establishes multiple support levels to provide technical support for problems occurring on the computing device. The problems are assigned to one or more support levels. The method then assigns one of the support levels to the computing device. The computing device is configured with the assigned support level to cause messages to be automatically sent to a support provider for problems associated with the assigned support level. This allows the support provider to provide support for problems associated with the assigned support level.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
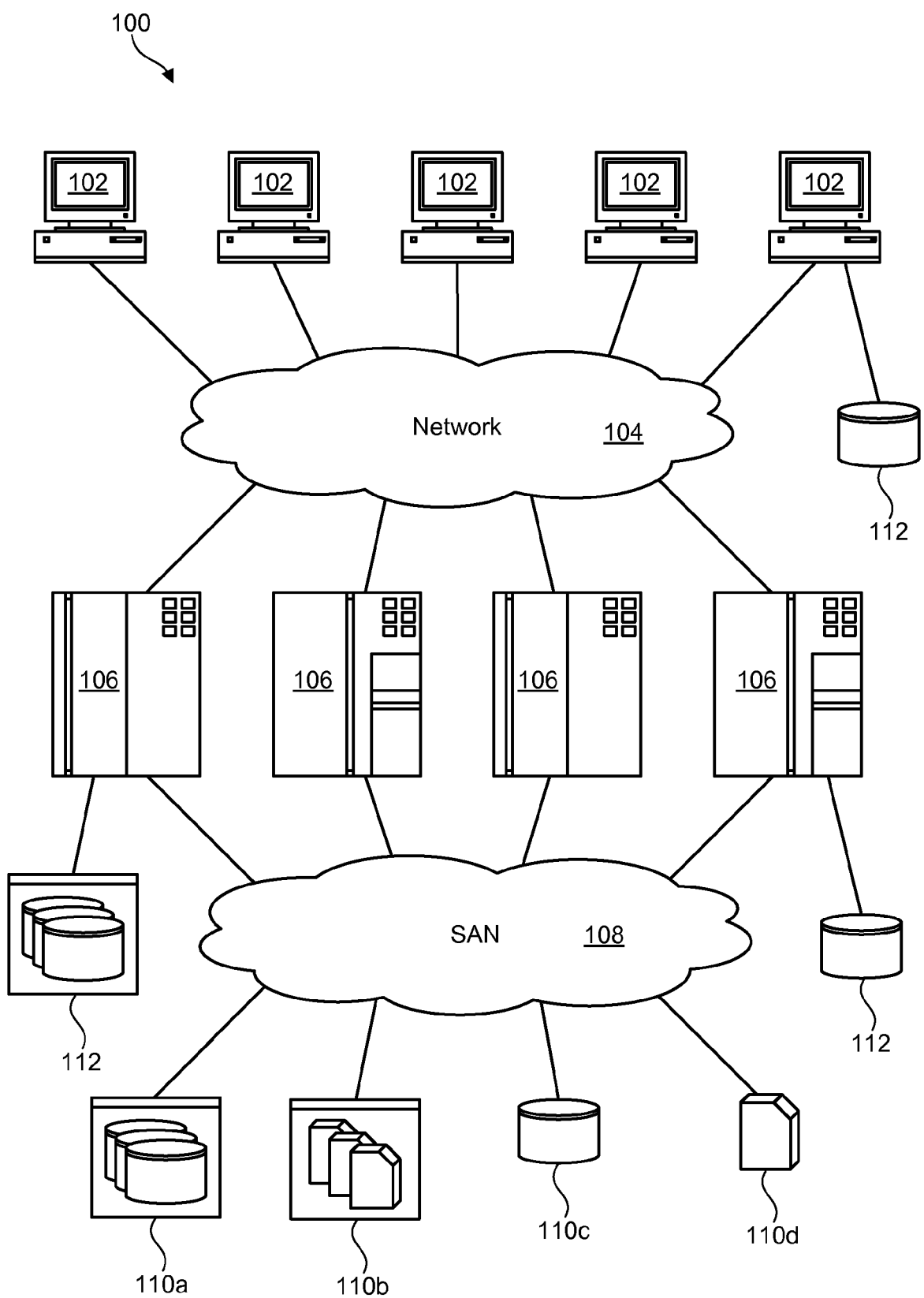
FIG. 1 is a high-level block diagram showing one example of a network environment where a system and method in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer program product. Furthermore, the present invention may take the form of a hardware embodiment, a software embodiment (including firmware, resident software, microcode, etc.) configured to operate hardware, or an embodiment combining software and hardware aspects that may all generally be referred to herein as a "module" or "system." Furthermore, the present invention may take the form of a computer-usable storage medium embodied in any tangible medium of expression having computer-usable program code stored therein.

Any combination of one or more computer-usable or computer-readable storage medium(s) may be utilized to store the computer program product. The computer-usable or computer-readable storage medium may be, for example but not limited to, an electronic, magnetic, optical, electromagnetic, infrared, or semiconductor system, apparatus, or device. More specific examples (a non-exhaustive list) of the computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. In the context of this document, a computer-usable or computer-readable storage medium may be any medium that can contain, store, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages. Computer program code for implementing the invention may also be written in a low-level programming language such as assembly language.

The present invention may be described below with reference to flowchart illustrations and/or block diagrams of methods, apparatus, systems, and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, one example of a network architecture 100 is illustrated. The network architecture 100 is presented to show one example of an environment where a system and method in accordance with the invention may be implemented. The network architecture 100 is presented only by way of example and is not intended to be limiting. Indeed, the systems and methods disclosed herein may be applicable to a wide variety of different network architectures in addition to the network architecture 100 shown.

As shown, the network architecture 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 112 (e.g., hard-disk drives, solid-state drives, tape drives, etc.). These computers 102, 106 and direct-attached storage systems 112 may communicate using protocols such as ATA, SATA, SCSI, SAS, Fibre Channel, or the like.

The network architecture 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, virtual tape libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC).

Figure 2:
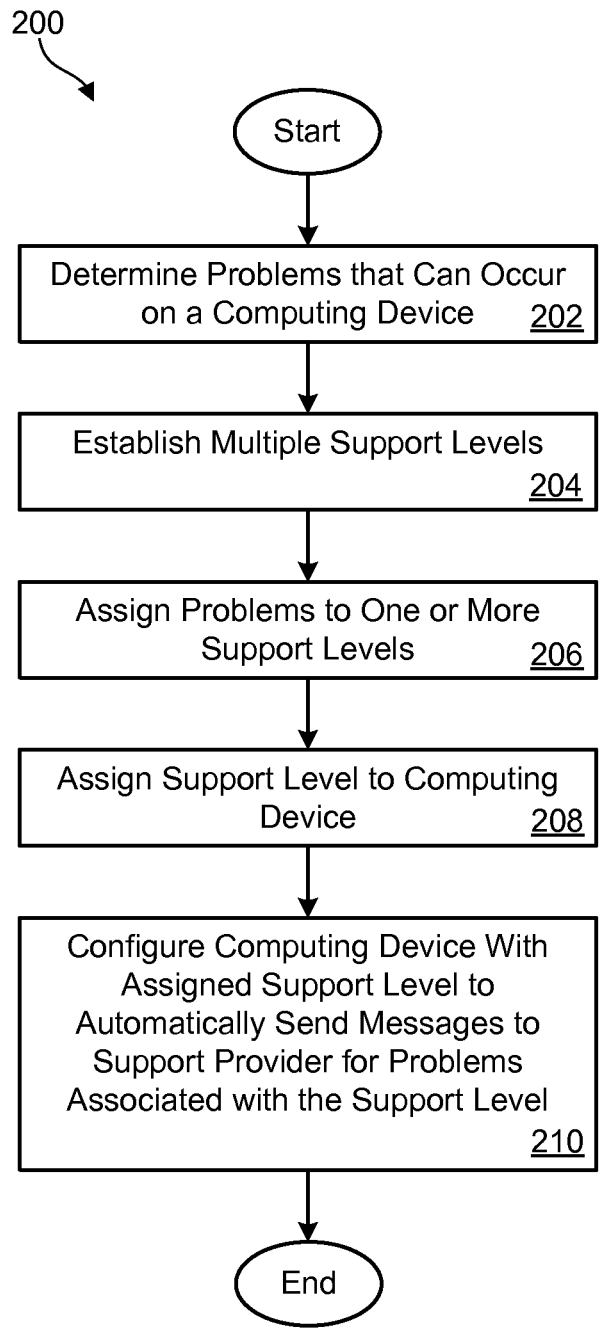
FIG. 2 is a flow diagram showing one embodiment of a method for providing technical support for a computing device.

Referring to FIG. 2, for the purposes of this description, each of the devices 102, 106, 110, 112 illustrated in FIG. 1 may be referred to as "computing devices." A computing device may also refer to a networking device such as a router, switch, or the like, or to a computer such as a personal computer or workstation. Thus, the phrase is used broadly to encompass a wide variety of computing hardware. The phrase "computing device" may also refer to an application (i.e., "software") running on a hardware device, such as a server, storage system, personal computer, networking device, or the like.

In certain embodiments, a "computing device," as defined above, may be configured to automatically contact a technical support provider upon encountering a problem, such as an error or other unexpected or undesirable condition. This may allow the technical support provider to address the problem by sending a technician to the site, directing a technician to address the problem remotely, or correcting the problem in some other suitable manner. In certain embodiments, the user of a computing device and the technical support provider are two different entities. For example, the computing device may be leased or owned by a customer and technical support may be provided by a vendor or third party in accordance with some agreed-upon service contract or warranty.

As previously described herein, many conventional service contracts and warranties are designed in an inflexible manner. Some may offer an "all-or-nothing" approach or a limited set of options that is insufficient for a diverse set of customers with different needs. For example, some customers may not employ technical support personnel and thus may require technical assistance for most if not all problems that occur on a computing device. Other customers may maintain a technical support staff to handle problems internally. Yet other customers may handle some problems internally while outsourcing other problems to a third party or vendor. Thus, it would be an advance in the art to more effectively tailor technical support to the needs of a customer. It would be a further advance to tailor the error-reporting capabilities of a computing device to facilitate the provision of different levels of technical support.

FIG. 2 shows one embodiment of a method 200 for providing technical support for a computing device. As shown, the method 200 initially determines 202 the different types of problems that can occur on a computing device. The method 200 then establishes 204 multiple support levels for the computing device. In certain embodiments, each of the support levels is designed for a particular customer (or a range of customers) with a particular set of needs and/or price point. Because customer needs may vary greatly, the number of support levels may also vary greatly.

Once the support levels are established 204, each of the problems determined at step 202 may be assigned to the support levels. Any desired criteria may be used to assign the problems to the support levels. For example, the problems may be assigned to the support levels based on severity, urgency of response needed, or other suitable criteria. One technique for assigning the problems to support levels based on severity level is described in association with FIG. 3. Once the problems are assigned 206 to the support levels, one of the support levels may be assigned 208 to a computing device. The computing device may be configured 210 with the assigned support level to automatically send a message to a support provider for any problem associated with the assigned support level. This will allow the support provider to take appropriate action to remedy the problem.

As customer needs change, the support level assigned to the computing device may be modified. For example, a customer may hire technicians and thereby reduce the customer's needs for technical support from external sources. In such a case, the customer may choose to downgrade the support level. Similarly, if a customer loses technicians, the customer may upgrade the support level to acquire more external support. In other cases, a customer may modify the support level to reduce costs. For example, a higher support level may provide more comprehensive support, and thus higher costs, while a lower support level may provide less comprehensive support, and thus lower costs. When marketing a computing product, a vendor may offer a variety of different warranty and service contracts to the customer, each corresponding to a different support level. The customer may then choose a support level that best suits the customer's needs for technical assistance and/or cost.

Figure 3:
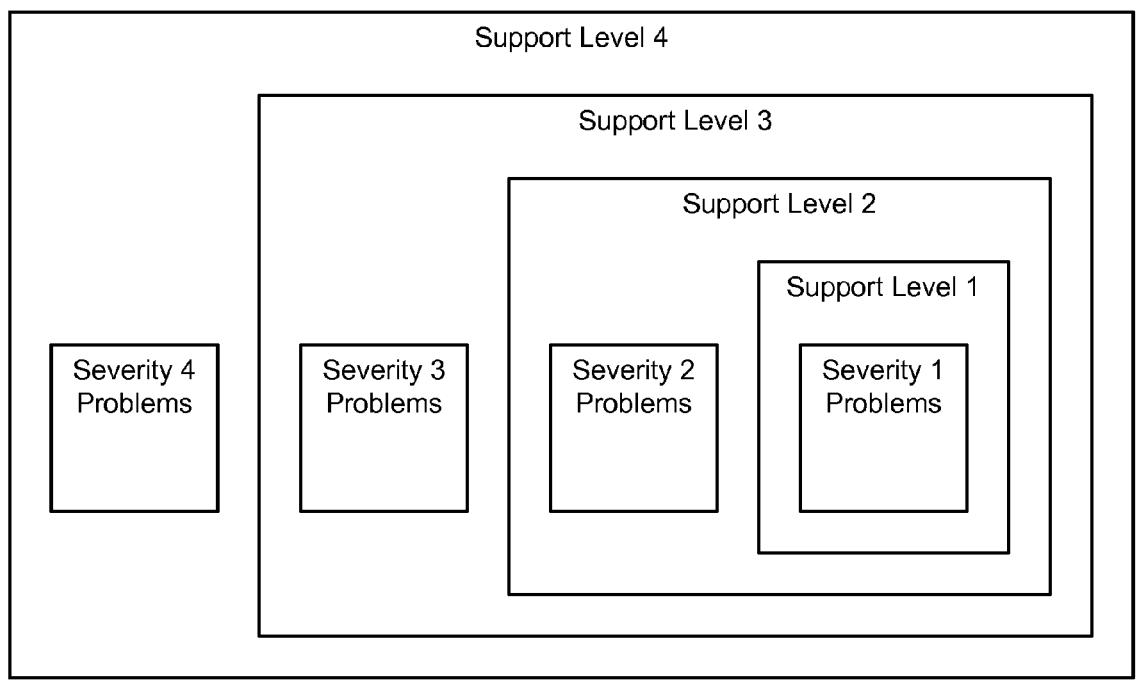
FIG. 3 is a high-level block diagram showing a possible relationship between support levels and problems.

FIG. 3 shows one possible technique for assigning problems to support levels based on severity. In this example, the problems are classified by severity with "Severity 1" problems being the most serious, and "Severity 4" problems being the least serious (such as preemptive error determination conditions). In this example Support Level 1 would provide technical support for only the most serious problems. Support Level 2 would provide technical support for both Severity 1 and Severity 2 problems, while Support Level 3 would provide technical support for Severity 1, Severity 2, and Severity 3 problems. Support Level 4 would provide technical support for problems of all severities. In this example, Support Level 1 would be the least comprehensive support level (and thus the least expensive), while Support Level 4 would be the most comprehensive support level (and thus the most expensive). Support Level 1 would only cause the computing device to send messages to the support provider for the most serious problems, while Support Level 4 would cause the computing device to send messages to the support provider for problems of all different severity levels.

In certain embodiments, a timing element is also associated with the support levels. For example, a lower level of support may only communicate errors during regular business hours while a higher level of support may communicate errors twenty-four hours per day and seven days per week. Such a timing element may also dictate when the support provider responds to messages that it receives. For example, a support provider may give higher priority to computing devices with a higher support level. Thus, a timing element may be associated with the various support levels to establish when messages are sent from the computing device to the support provider and when the support provider responds to such messages.

Figure 4:
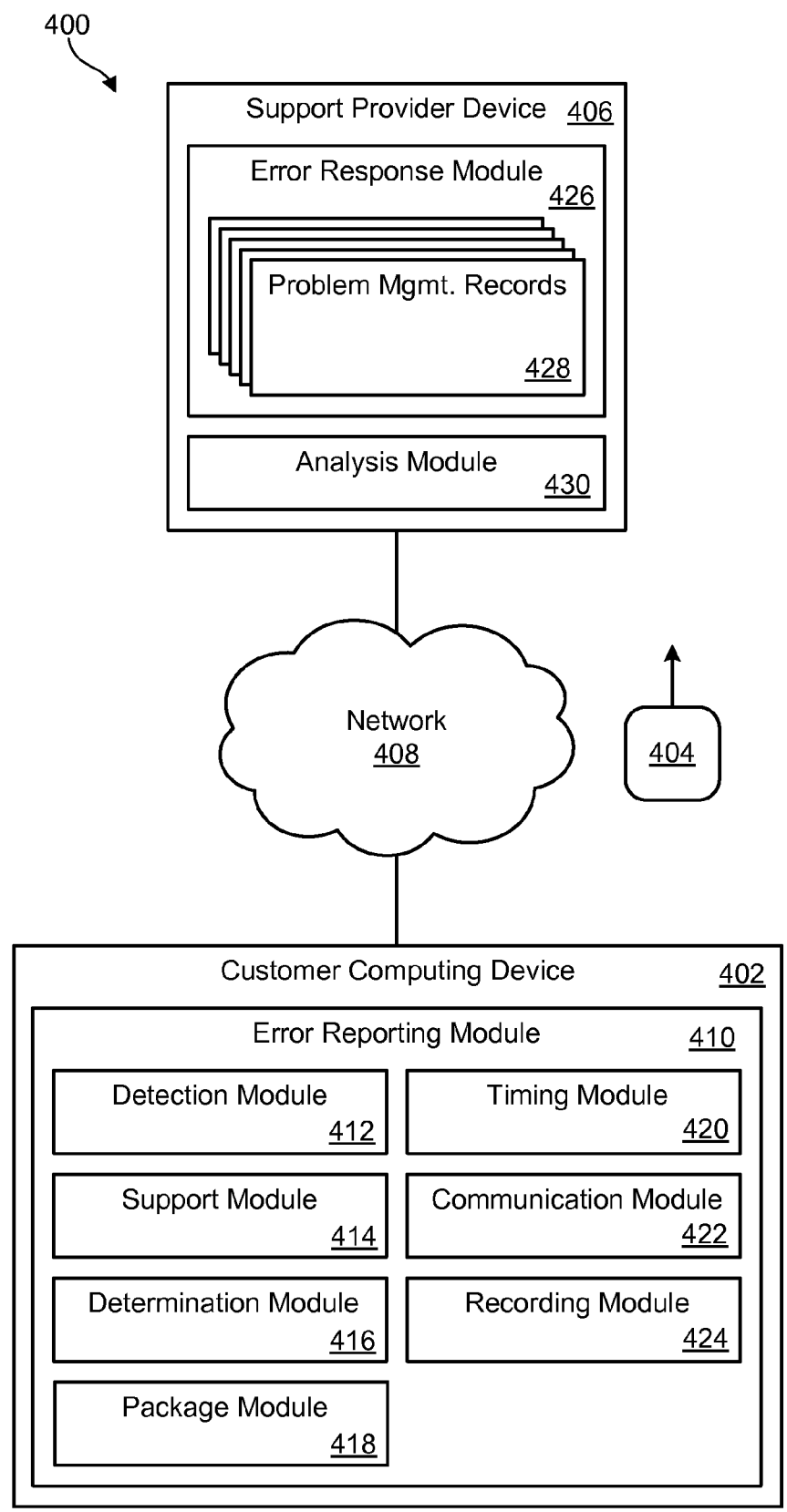
FIG. 4 is a high-level block diagram showing one embodiment of a system for providing technical support for a computing device.

Referring to FIG. 4, one embodiment of a system 400 for providing technical support for a computing device is illustrated. As shown, in selected embodiments, a customer computing device 402 is configured to communicate with a support provider device 406 by way of a network 408, such as the Internet, a private network, a wide-area-network (WAN), a dial-up connection over a modem, or the like. Any number of intermediate devices may exist between the customer computing device 402 and the support provider device 406.

As described hereinbefore, when a problem occurs, the customer computing device 402 is configured to send messages 404 to the support provider device 406 in accordance with its assigned support level. To accomplish this, the customer computing device 402 includes one or more modules. These modules may be implemented in hardware, software or firmware executable on hardware, or a combination thereof. These modules are presented only by way of example and are not intended to be limiting. Indeed, alternative embodiments may include more or fewer modules than those illustrated. It should also be recognized that, in some embodiments, the functionality of some modules may be broken into multiple modules or, conversely, the functionality of several modules may be combined into a single module or fewer modules. It should also be recognized that the modules are not necessarily implemented in the locations where they are illustrated. For example, some functionality shown in a customer computing device 402 may actually be implemented in a service provider device 406 and vice versa. Other functionality shown in a single customer computing device 402 or a single support provider device 406 may actually be distributed across multiple devices. Thus, the location of the modules is presented only by way of example and is not intended to be limiting.

As shown, in selected embodiments, a customer computing device 402 may include an error reporting module 410 to report problems in accordance with an assigned support level. In selected embodiments, the error reporting module 410 includes one or more of a detection module 412, a support module 414, a determination module 416, a package module 418, a timing module 420, a communication module 422, and a recording module 424.

The detection module 412 is configured to detect a problem that occurs on the customer computing device 402 or is otherwise related to the customer computing device 402 in some way. A support module 414 determines the support level that is assigned to the computing device 402. Once the support level is determined, a determination module 416 determines whether the problem belongs to the set of problems associated with the support level. If the problem belongs to the set, a package module 418 gathers information about the problem. This information may include traces, dump files, logs, files, or other information about the problem such as hardware and code configuration information. A timing module 420 determines the timing associated with the support level. For example, the timing module 420 may determine, based on the assigned support level, what hours of the day and/or days of the week that a message 404 may be sent to the support provider 406.

Once the necessary timing is determined, the communication module 422 sends a message 404 to the support provider 406 at the appropriate time to provide notice of the problem. This message 404 may contain or be shortly followed by the package of information previously discussed. In selected embodiments, an error response module 426 at the service provider device 406 generates a problem management record 428 in response to receiving the message 404. This problem management record 428 may store information about the problem such as the package of information previously discussed. The problem management record 428 may then be assigned to a service technician so that he or she can address the problem.

In selected embodiments, a recording module 424 may be used to record information about problems that do not belong to the set of problems associated with the assigned support level. This information may be periodically communicated to the support provider 406 for analysis. An analysis module 430 may analyze this information to determine whether the customer should upgrade the support level (to improve service and customer satisfaction with the computing device 402) or downgrade the support level. This information may also be used to determine if the computing device 402 can be improved in some way. For example, the information may be used to improve future code releases or hardware. In some cases, problem severity may be reevaluated with each code release to determine if problems should be associated with other support levels.

Figure 5:
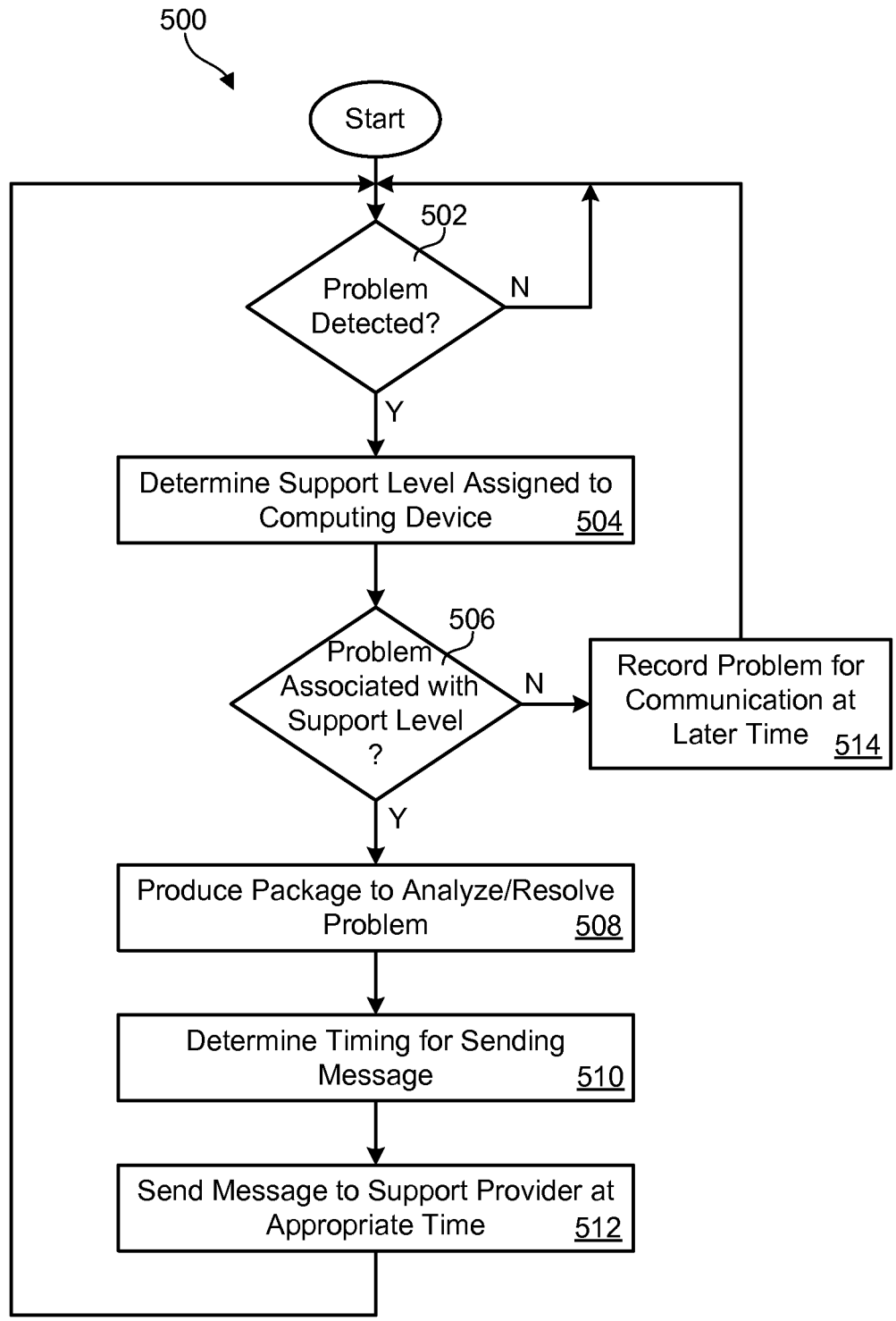
FIG. 5 is a flow diagram showing one embodiment of a method for handling problems at a computing device.

Referring to FIG. 5, one embodiment of a method 500 for handling problems at a computing device 402 is illustrated. As shown, the method 500 initially determines 502 whether a problem has been detected at the computing device 402. Once a problem is detected, the method 500 determines 504 the support level that is assigned to the computing device 402. The method 500 then determines 506 whether the problem is associated with the assigned support level. If so, the method 500 produces 508 a package of information needed to analyze/resolve the problem, such as traces, dump files, logs, files, or other information. The method 500 also determines 510 the timing for sending a message to the support provider 406. Once the timing is determined, the method 500 sends 512 the message to the support provider at the appropriate time. The support provider can then respond to the problem as appropriate.

If, at step 506, the method 500 determines that the problem is not associated with the assigned support level, the method 500 records 514 the problem (along with any ancillary information such as traces, dump files, logs, files, or the like) for communication at a later time. Once communicated, this information may be analyzed by the service provider 406 to determine if the customer should modify the assigned support level of the computing device 402 or if the computing device 402 can be improved in some way.

Figure 6:
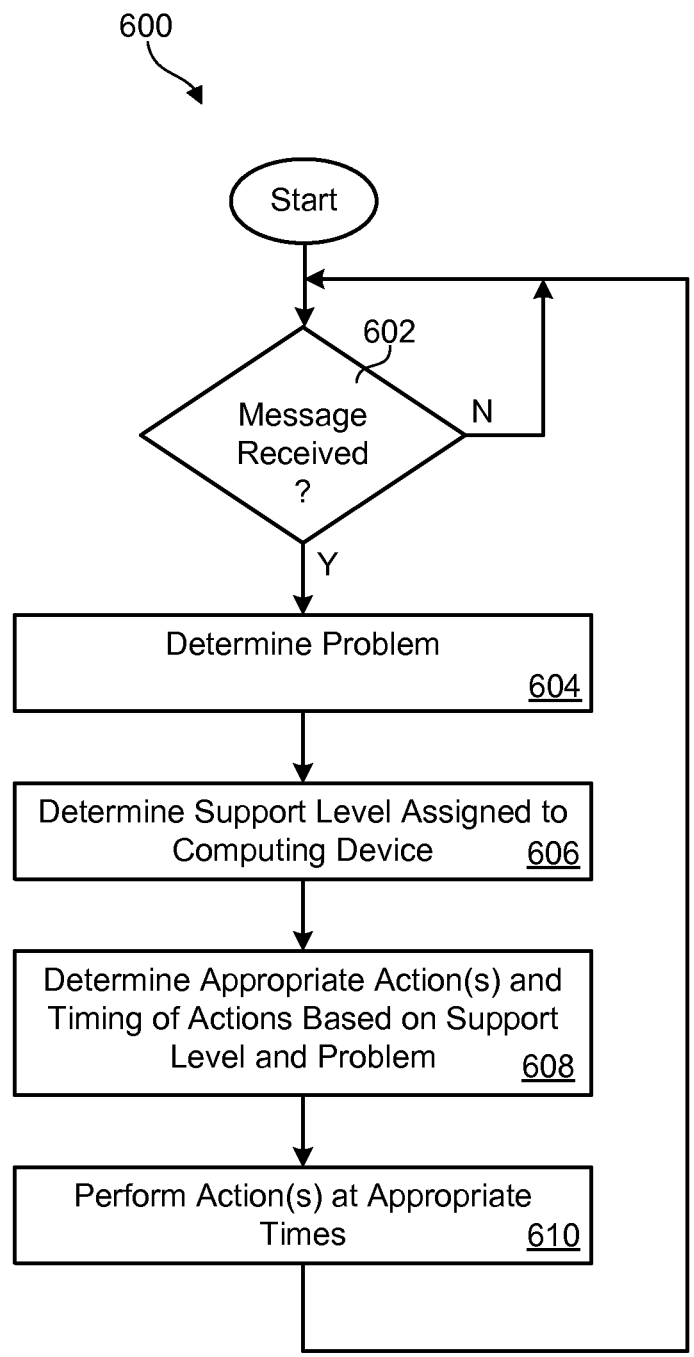
FIG. 6 is a flow diagram showing one embodiment of a method for responding to messages from a computing device.

Referring to FIG. 6, one embodiment of a method 600 for responding to a message from a computing device 402 is illustrated. Such a method 600 may, in certain embodiments, be executed by the service provider 406. As shown, the method 600 initially determines 602 whether a message has been received. Once a message has been received, the method 600 determines 604 the problem and determines 606 the support level that is assigned to the computing device 402. The method 600 then determines 608 the appropriate actions to take based on the problem and the assigned support level. The method 600 may also determine 608 the timing for performing such actions. The method 600 may then perform 610 the appropriate actions at the appropriate times. Thus, in selected embodiments, the support provider 406 may use the assigned support level to determine the appropriate actions to take in response to a problem.

Figure 7:
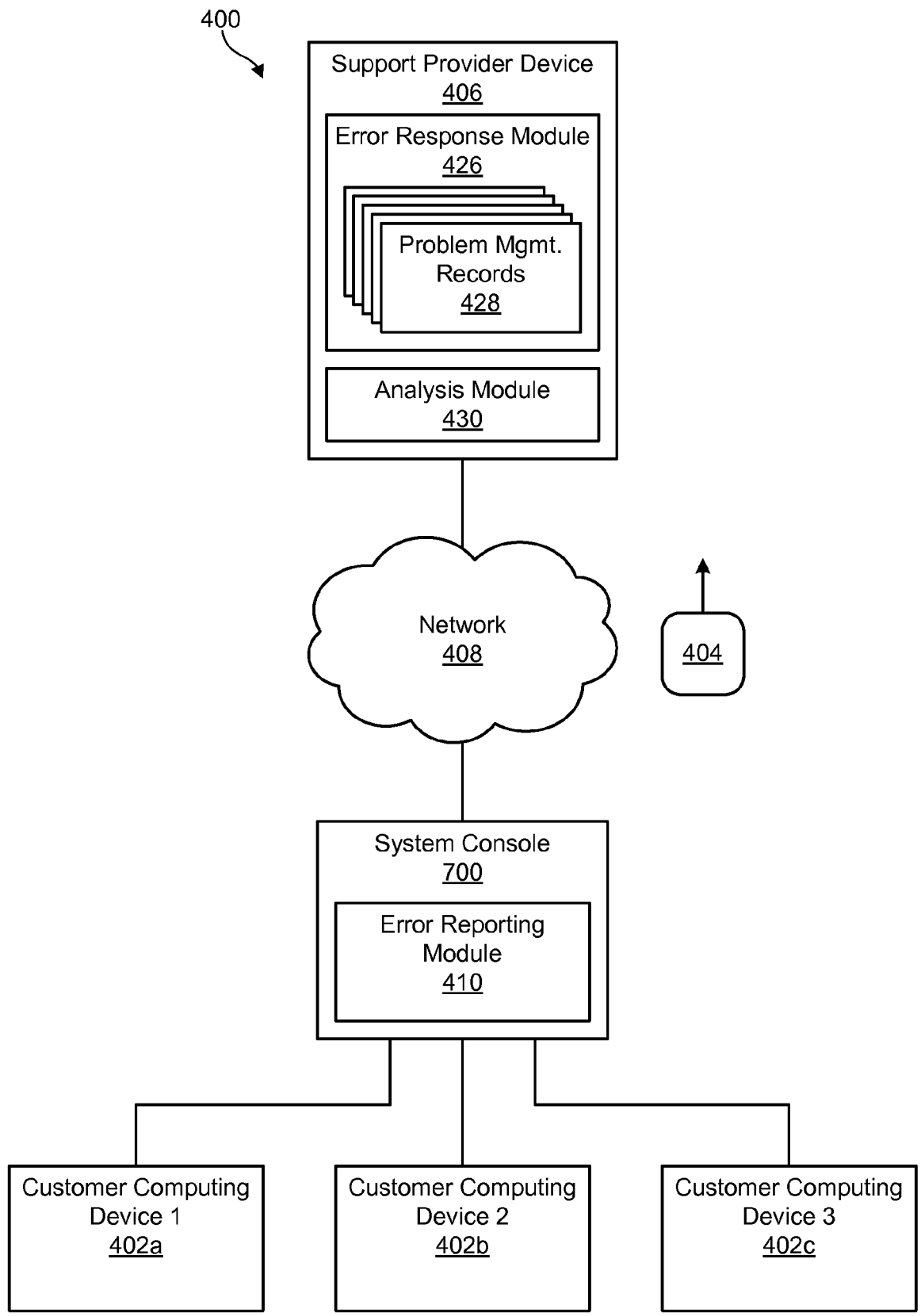
FIG. 7 is a high-level block diagram showing an alternative embodiment of a system for providing technical support for a computing device.

Referring to FIG. 7, an alternative embodiment of a system 400 for providing technical support for a computing device is illustrated. In this embodiment, a system console 700 provides a single point of communication between a service provider 406 and multiple computing devices 402a-c. An error reporting module 410 is provided in the system console 700 to send messages 404 to the support provider 406 on behalf of the computing devices 402a-c. The functionality of the error reporting module 410 may be included solely in the system console 700 or be distributed across the system console 700 and other computing devices 402a-c. In general, the error reporting module 410 detects problems that occur on connected computing devices 402. If a problem is detected on a computing device 402, the error reporting module 410 determines the assigned support level for the computing devices 402 on which the problem occurred, and sends a message 404 to the storage provider 406 if the problem belongs to the set of problems associated with the support level. The error reporting module 410 may also include the other functionality described previously in association with FIG. 4.

The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A computer program product to provide technical support for a computing device, the computer program product comprising:

a computer-readable storage medium having computer-usable program code embodied therein, the computer-usable program code comprising:
  computer-usable program code to detect a problem associated with a computing device;
  computer-usable program code to determine a support level assigned to the computing device, the support level having associated therewith a set of problems for which the computing device will automatically send a message to a support provider upon occurrence of a problem in the set;
  computer-usable program code to determine whether the problem belongs to a set of problems associated with the support level;
  computer-usable program code to cause the computing device to automatically send a message to the support provider in the event the problem belongs to the set, while refraining from sending a message to the support provider in the event the problem does not belong to the set;
  computer-usable program code to enable a user to upgrade the support level of the computing device, thereby expanding the set of problems for which the computing device will automatically send a message to the support provider; and
  computer-usable program code to enable a user to downgrade the support level of the computing device, thereby reducing the set of problems for which the computing device will automatically send a message to the support provider.

2. The computer program product of claim 1, wherein the support level is one of a plurality of support levels, each having a different set of problems associated therewith.

3. The computer program product of claim 2, wherein the problems are included in each set based on severity.

4. The computer program product of claim 2, wherein each of the plurality of support levels has a timing associated therewith, the timing designating at least one of: (1) when the computing device sends messages to the support provider, and (2) when the support provider responds to messages from the computing device.

5. A system to provide technical support for a computing device, the system comprising:
  a plurality of modules implemented in at least one of hardware and software operating hardware, the plurality of modules comprising:
    a detection module to detect a problem associated with a computing device;
    a support module to determine a support level assigned to the computing device, the support level having associated therewith a set of problems for which the computing device will automatically send a message to a support provider upon occurrence of a problem in the set;
    a determination module to determine whether the problem belongs to a set of problems associated with the support level;
    a communication module to cause the computing device to automatically send a message to the support provider in the event the problem belongs to the set, while refraining from sending a message to the support provider in the event the problem does not belong to the set;
    the support module further configured to enable a user to upgrade the support level of the computing device, thereby expanding the set of problems for which the computing device will automatically send a message to the support provider; and
    the support module further configured to enable a user to downgrade the support level of the computing device, thereby reducing the set of problems for which the computing device will automatically send a message to the support provider.

6. The system of claim 5, wherein the support level is one of a plurality of support levels, each having a different set of problems associated therewith.

7. The system of claim 6, wherein the problems are included in each set based on severity.

8. The system of claim 5, further comprising a recording module to record information about problems that do not belong to the set of problems associated with the support level.

9. The system of claim 8, wherein the communication module is further configured to periodically communicate the information to the support provider.

10. The system of claim 9, further comprising an analysis module to analyze the information to determine at least one of the following: (1) whether a customer should upgrade or downgrade the support level; and (2) ways to improve the computing device.

* * * * *